June 6, 1950 R. S. ELY 2,510,742
ELECTRONIC CONTROL
Filed March 3, 1948
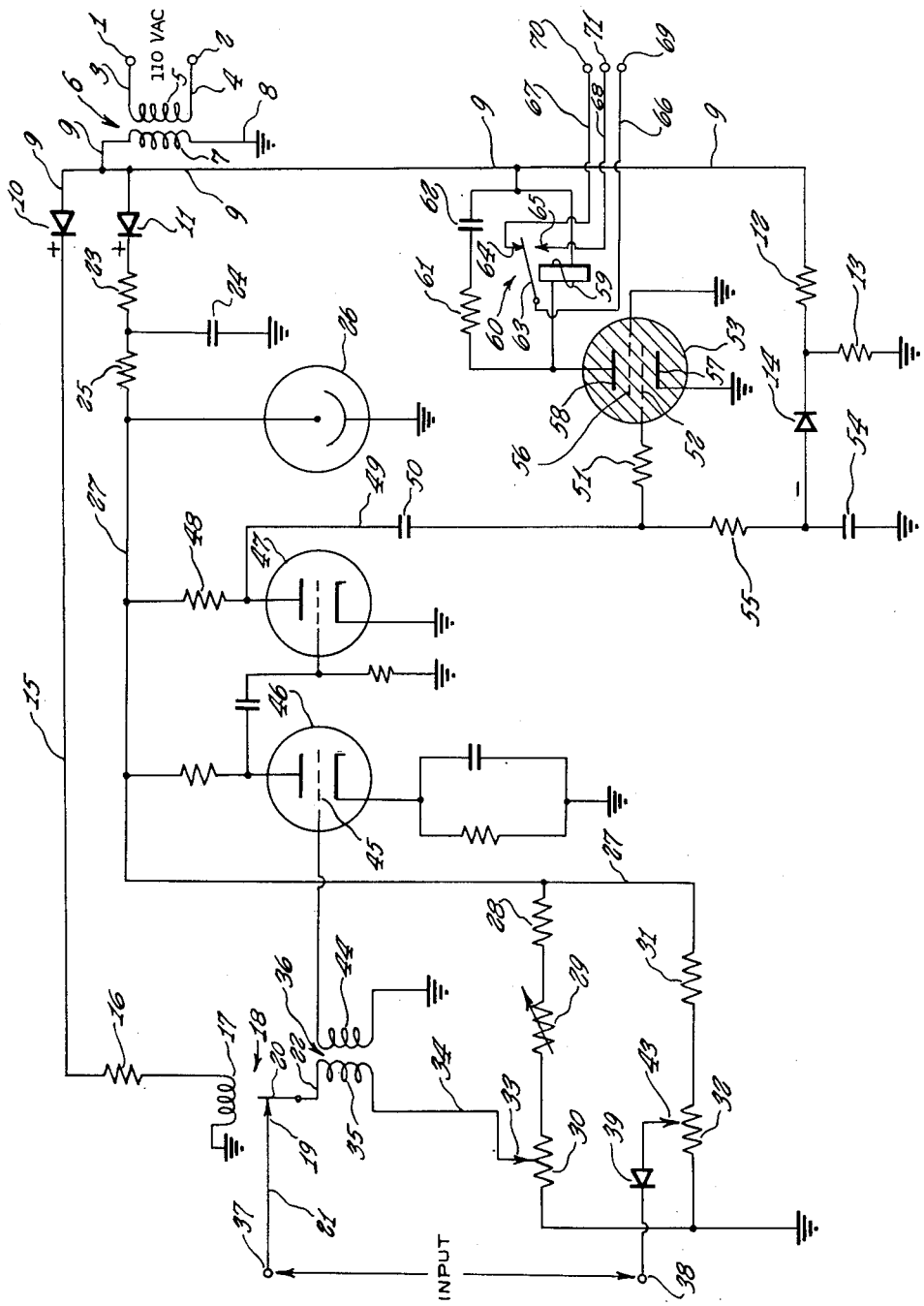
INVENTOR.
ROBERT S. ELY
BY
Moses, Nolte, Crews + Berry
ATTORNEYS Patented June 6, 1950

2,510,742

UNITED STATES PATENT OFFICE 2,510,742

ELECTRONIC CONTROL

Robert S. Ely, Westbury, N. Y., assignor, by mesne assignments, to T. Arthur Nosworthy, Bronxville, N. Y.

Application March 3, 1948, Serial No. 12,747

12 Claims. (Cl. 315—349)

The present invention relates to electrical regulating devices and more particularly to devices of this character which are responsive to electrical potentials of extremely small magnitude such as those generated by a thermocouple or photocell for example.

An object of the invention is to provide a regulating device in which immediate response to a change in condition can be obtained as a result of a very small and gradual variation in the magnitude of an electrical potential accompanying such change. The electrical potential in which the small and gradual variation occurs may itself be of small magnitude.

A further object of the invention is the provision of a device of this character in which a small direct current control potential is converted into an intermittent potential for purposes of amplification and the subsequent production of a control effect.

A further object of the invention consists in the provision of a control device of this character comprising a calibrated dial which permits the magnitude of a controlled quantity such as temperature, to be set to a predetermined value as desired.

Still another object of the invention consists in the provision of a control device having characteristics which permit it to operate effectively by making and breaking electrical circuits without the production of any exposed electrical arc. An exposed arc would be extremely hazardous in those instances where the apparatus is operated in an explosive atmosphere. The production of such arcs is to be avoided under such conditions notwithstanding the further enclosure of the entire apparatus within a separate explosion proof housing.

Other and further objects will become apparent upon reading the following specification together with the accompanying drawing in which the single figure represents a schematic circuit diagram of a control unit embodying the invention.

Referring to the drawing, there is shown diagrammatically apparatus comprising a pair of terminals 1 and 2 adapted to be energized by a commercial source of alternating current which may be, for example, the usual 115 volt 60 cycle supply. Terminals 1 and 2 are connected by conductors 3 and 4 to the primary winding 5 of a transformer designated generally as 6. The transformer 6 is provided for the purpose of insulating the apparatus within the control unit from the commercial power supply and also for the further purpose of providing a voltage of suitable magnitude for energization of the various components of the control device. This voltage may be higher or it may be lower than the energizing voltage applied to terminals 1 and 2, depending upon the particular value of the energizing voltage so applied. The transformer 6 is provided with a secondary winding 7 arranged to deliver the correct voltage to the component apparatus of the control unit. One side of secondary winding 7 is shown connected to ground at 8 and the other side is shown connected by a conductor 9 to rectifiers 10 and 11. Conductor 9 further extends to a pair of series connected resistors 12 and 13 which make a predetermined fraction of the voltage appearing across the secondary winding 7 of transformer 6 available at rectifier 14 for grid biasing purposes as hereinafter described.

The output of rectifier 10 is shown as being positive with respect to ground thereby causing half-wave pulses of positive polarity to flow through a conductor 15 and a current limiting resistor 16 to the winding 17 of a synchronously operating circuit interrupting device designated generally as 18. Circuit interrupting device 18 is shown by way of illustration as being of the electromagnetic type. It is shown provided with a winding 17 which is intermittently energized by the successive positive pulses of current from rectifier 10. This intermittent energization takes place at a rate determined by the frequency of the alternating current energy supply at terminals 1 and 2 and causes a pair of contacts 19 and 20 to engage and disengage each other cyclically at a rate determined by and synchronously related to the frequency of the alternating current. Any other desired form of equivalent circuit interrupting device may be used.

A rectifier 11 is energized from conductor 9 by transformer secondary winding 7 and the positive half wave pulsations produced by this rectifier are filtered by resistor 23, capacitor 24 and a further resistor 25. The filtered voltage thus produced is applied to a voltage regulator tube 26 which is shown by way of illustration as being of the gas filled type. Regulator tube 26 serves to maintain the voltage on conductor 27 at a substantially constant value notwithstanding a substantial range of variation in the value of the line voltage applied to terminals 1 and 2. This regulated voltage is applied to a group of series connected resistors 28, 29 and 30 and also to a further group of series connected resistors 31 and 32, the two groups being connected in multiple. Resistor 30 is shown as being of a potentiometer type having a movable contact 33 connected to a conductor 34 which extends to one side of the primary winding 35 of an amplifier input transformer designated generally as 36. This circuit continues through conductor 22 to contacts 19 and 20 of interrupting device 18 and conductor 21 to an input terminal 37. The other input terminal 38 is shown connected through a rectifier 39 of low internal resistance to the movable contact 43 of the potentiometer type resistor 32. By adjustment of movable contacts 33 and 43, a steady direct current potential is obtained which may be used to balance any steady residual potential applied to input terminals 37 and 38. Resistor 29 is shown as being of the adjustable type. It is contemplated that resistor 30 and resistor 29 will be calibrated in any desired scale of measurement units and that resistor 32 will be used for zero correction.

The closed circuit comprising input terminals 37 and 38 also includes the primary winding 35 of transformer 36. A secondary winding 44 of transformer 36 extends to the grid 45 of a triode 46 which is shown coupled to a further triode 47, the two triodes 46 and 47 being connected as a conventional two stage resistance coupled amplifier. The contacts 19 and 20, in the course of cyclically making and breaking the circuit including primary winding 35 of transformer 36 will generate a series of pulses as result thereof.

These pulses produced by shock excitation, are of sufficient magnitude to be amplified by the resistance coupled amplifier comprising triodes 46 and 47. The output from triode 47 and coupling resistor 48 is carried via conductor 49 and coupling capacitor 50 to a grid resistor 51 and the control grid 52 of a space discharge device shown as a tetrode 53 which is indicated as being of the gas filled type. Control grid 52 is maintained at a suitable negative potential by rectifier 14 which is energized at a reduced voltage from the junction between resistors 12 and 13, this reduced voltage being an appropriate fraction of the voltage from secondary winding 7 of transformer 6. The biasing voltage from rectifier 14 is filtered by a capacitor 54 of relatively large value and is applied through a resistor 55 which in turn applies a suitable direct current potential to grid resistor 51.

The transformer secondary winding 44 of transformer 36 is so connected that the pulses, after being amplified in the resistance coupled amplifier comprising the triodes 46 and 47, will have a polarity which is in a positive sense with respect to ground upon reaching control grid 52 thereby tending to cause firing of the gas filled tetrode 53. During successive half cycles of the alternating current supply, the voltage on conductor 9 becomes negative and in so doing drops below the critical value required to sustain ionization of tetrode 53. The negative bias from rectifier 14 prevents reionization of the gas within tetrode 53 in the absence of a suitable pulse during the positive portion of the cycle. Conduction through tetrode 53 therefore ceases between successive positive half-waves on conductor 9. The suppressor grid 56 of tetrode 53 is connected to the cathode 57 and to ground in the usual manner. Anode 58 is connected through the energizing winding 59 of a relay designated generally as 60 to conductor 9 which is energized from the secondary winding 7 of transformer 6. In order to reduce the hum which would otherwise be present in relay 60 as a result of the intermittent energization of winding 59, a by-pass arrangement comprising the series combination of a resistor 61 and a capacitor 62 is shown connected in multiple with energizing winding 59. Other forms of hum reducing devices may be used if desired.

Relay 60 is shown by way of illustration as being provided with a single pole double throw contact arrangement comprising the movable contact 63 arranged to disengage fixed contact 64 and engage fixed contact 65 upon energization of winding 59. The relay contacts 63, 64 and 65 are shown connected by conductors 66, 67 and 68 to terminals 69, 70 and 71 respectively for connection to control circuits external to the apparatus illustrated. The control circuits may control the energization of heating or refrigerating apparatus, or other devices as required.

In operation, if the control voltage is to cause operation of relay 60, it must be of such polarity as to cause the pulses produced by interrupter 18 to be applied to grid 45 of triode 46 in the positive sense after amplification so that they will cause firing of gas filled tetrode 53 and operation of relay 60. When the polarity of the input potential is reversed, the pulses will be applied to grid 45 in a negative sense and either will not be amplified by triodes 46 and 47 or will be applied to tetrode 53 in a negative sense. As a result no firing of tetrode 53 will be produced and consequently no operation of relay 60 will be obtained. Because of the constant potentials derived from regulator tube 26, the operation can be made responsive to a very small range of variation in the interrupted potential applied to the primary winding 35 of transformer 36, notwithstanding a wide range of variation in the power supply voltage applied to terminals 1 and 2.

In instances where there is not sufficient difference in the magnitude between the pulses which occur upon the breaking of contacts 19 and 20 and the pulses which occur upon closure of these contacts, the rectifier 39 may advantageously be included in the input circuit as shown. Otherwise, rectifier 39 may be omitted. Inclusion of rectifier 39 renders the circuit responsive to a predetermined polarity of control potential applied to input terminals 37 and 38.

It should also be noted that the positive pulses applied along conductor 15 to interrupting device 18 are so applied at approximately the same instant and in phase with positive peaks of alternating current on conductor 9 that the sharp positive peaks produced by coil 44 on grid 45 and grid 52 tend to cause firing of gas filled tetrode 53. By suitable adjustment of the contacts 19 and 20 of interrupting device 18, they may be caused to open at an instant when gas filled tetrode 53 is in a condition to fire and to close later when tetrode 53 is no longer in condition to fire because a reduced or negative potential is applied to its anode through winding 59 of relay 60. This causes the gas filled tetrode 53 to be in a condition where it may be fired only at the instant when contacts 19 and 20 disengage each other, thereby making it responsive to the polarity of the accompanying pulse without interference from the pulse which occurs on closure of these contacts. Under these circumstances, input rectifier 39 must be polarized accordingly, or it may be omitted entirely.

Where it is desired to reverse the polarity of the direct current applied to input terminals 37 and 38 to which the control unit is responsive, this may be done conveniently by reversal of the polarity of secondary winding 44 of transformer 36. If input rectifier 39 is used, this must be so connected that it does not oppose the flow of current in the desired direction.

It will thus be seen that an applied control potential impressed at input terminals 37 and 38 may be substantially balanced by an opposing potential of calibrated value determined by appropriate manipulation of resistors 29, 30 and 32. When the applied control potential changes its value in one direction, an interrupted current will flow through primary winding 35 of transformer 36. Assuming that this current flow is in a direction to cause actuation of the control unit, then a change of magnitude of the control potential in the opposite direction will produce a current flow in the direction to which the control unit is unresponsive.

From the foregoing, it will be apparent that where the input potential applied to terminals 37 and 38 is derived from a source such as a thermocouple for example, the control unit may be made to operate to control the application of heat so that a constant temperature may be maintained. Similarly, a control potential may be derived from the unbalancing of a Wheatstone bridge circuit, a copper oxide type photocell, a chemical reaction or other desired manner. Irrespective of the source from which the direct current control potential is derived, the control unit will respond to extremely small variations in the magnitude thereof and the control potential itself may be small magnitude.

Where the apparatus is to be operated in the presence of explosive atmospheres such as are likely to be encountered in oil refineries, gas generating plants and similar installations, relay 60 may be of a type having enclosed contacts such as a mercury plunger type relay. The current flowing through contacts 19 and 20 of interrupter 18 is so small that no enclosure is ordinarily required, but it may be provided as an additional precaution if it is thought to be desirable.

I have shown what I believe to be the best embodiment of my invention. I do not wish, however, to be limited to the embodiment shown, but what I wish to cover by Letters Patent is defined in the appended claims.

I claim:

1. In a device of the class described, a source of alternating current, an input circuit adapted to receive a current of small magnitude, interrupting means arranged to completely interrupt the input circuit cyclically in accordance with the alternations of the alternating current, an inductance included in the input circuit arranged to derive sharp shock excitation pulses from the cyclic interruptions of current flowing therein, amplifying means coupled to the inductance and arranged to amplify the pulses, and control means responsive to said shock excitation pulses.

2. A device as in claim 1 in which the control means is responsive only to pulses exceeding a predetermined minimum magnitude.

3. A device as in claim 1 in which the control means is responsive only to pulses of predetermined polarity which exceed a predetermined minimum magnitude.

4. A device as in claim 1 in which the control means comprises a space discharge device of the gas-filled type.

5. An electric relay device including a closed input circuit for receiving a small magnitude control current and voltage, a transformer having a primary winding and a secondary winding, contacts in said input circuit to interrupt current through said primary winding, an electron discharge device of the gas filled type having an output circuit, alternating voltage supply connections for said output circuit, relay means in said output circuit responsive to passage of discharge current therethrough, a control electrode for said discharge device, means for biasing said control electrode below the potential required to start discharge current through said output circuit, means for operating said contacts to interrupt current in said primary winding to generate shock excitation voltage pulses in said secondary winding in timed relation with the alternating voltage applied to said output circuit, and means connecting said secondary winding with said control electrode to transmit said voltage pulses thereto in phase to oppose said biasing means, said interrupting means being timed to transmit the peak voltage pulses generated by shock excitation of said secondary winding to said control electrode in time to start discharge current through said output circuit in response to alternating voltage from said supply connections.

6. An electric relay device according to claim 5, including a direct current amplifier having its input connected with said secondary winding and its output connected with said control electrode.

7. An electric relay device according to claim 5, having an adjustable source of voltage connected to said primary winding in opposition to said control current.

8. An electric relay device according to claim 5, having an adjustable source of voltage connected to said primary winding in opposition to said control current, and means for opposing the flow of current in said input circuit in opposition to said control current.

9. An electric relay device according to claim 5, having an adjustable source of voltage connected to said primary winding in opposition to said control current, and a rectifier opposing the flow of current in said input circuit in opposition to said control current.

10. The method of employing a transformer having a primary and a secondary in combination with an electron discharge device of the gas filled type having alternating voltage applied to the output circuit thereof and having a bias voltage on a control electrode thereof to prevent the passage of discharge current when the alternating voltage has the proper polarity to pass said current, said method being for the purpose of operating said discharge device in response to a very small control current, said method comprising passing said current through the primary of the transformer, completely interrupting said current in timed relation with said alternating voltage to produce sharp voltage pulses in the secondary of the transformer, transmitting said voltage pulses to said control electrode with a polarity opposing the bias thereon, timing the interruptions of the primary current to transmit the voltage pulses to the control electrode at a time when the alternating voltage in the output circuit permits the passage of current therethrough, and utilizing the resulting discharge current through the output circuit.

11. The method according to claim 10, which comprises amplifying said voltage pulses before transmitting the pulses to the control electrode.

12. The method according to claim 10, which comprises opposing the flow of current through the primary of the transformer in a direction opposite to that of the control current.

ROBERT S. ELY.

REFERENCES CITED

The following references are of record in the file of this patent:

UNITED STATES PATENTS

| Number | Name | Date |
|---|---|---|
| 2,113,164 | Williams, Jr. | Apr. 5, 1938 |
| 2,297,543 | Eberhardt et al. | Sept. 29, 1942 |
| 2,323,966 | Artzt | July 13, 1943 |
| 2,457,791 | Wild | Dec. 28, 1948 |